United States Patent
Hui et al.

(10) Patent No.: US 9,590,790 B2
(45) Date of Patent: *Mar. 7, 2017

(54) OPTIMIZING THROUGHPUT OF DATA FRAMES IN ORTHOGONAL FREQUENCY DIVISION MULTIPLEXING (OFDM) COMMUNICATION NETWORKS

(71) Applicant: Cisco Technology, Inc., San Jose, CA (US)

(72) Inventors: Jonathan W. Hui, Belmont, CA (US); Jean-Philippe Vasseur, Anchorage, AK (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,845

(22) Filed: Sep. 28, 2015

(65) Prior Publication Data

US 2016/0156450 A1 Jun. 2, 2016

Related U.S. Application Data

(63) Continuation of application No. 13/538,442, filed on Jun. 29, 2012, now Pat. No. 9,166,845.

(51) Int. Cl.
*H04K 1/10* (2006.01)
*H04L 5/00* (2006.01)
(Continued)

(52) U.S. Cl.
CPC ............. *H04L 5/0064* (2013.01); *H04B 3/54* (2013.01); *H04J 11/00* (2013.01); *H04L 5/003* (2013.01);
(Continued)

(58) Field of Classification Search
CPC ....... H04L 27/00; H04L 5/00; H04L 27/2601; H04B 3/54; H04J 11/00
(Continued)

(56) References Cited

U.S. PATENT DOCUMENTS 6,072,773 A 6/2000 Fichou et al.
6,118,791 A 9/2000 Fichou et al.
(Continued)

FOREIGN PATENT DOCUMENTS

EP 1388954 A2 2/2004
GB 2443009 A 4/2008
(Continued)

OTHER PUBLICATIONS

Jain et al., "Practical, Real-Time, Full Duplex Wireless", MobiCom 2011, Sep. 19-23, 12 pages, Association for Computing Machinery, Las Vegas, Nevada.
(Continued)

*Primary Examiner* — Helene Tayong
(74) *Attorney, Agent, or Firm* — Parker Ibrahim & Berg LLC; James M. Behmke; Stephen D. LeBarron (57) ABSTRACT

In one embodiment, a device maintains a predetermined number of high-priority subcarriers for use in communicating high-priority data frames and a predetermined number of low-priority subcarriers for use in communicating low-priority data frames. A data frame is received and a data frame priority is determined for the data frame. If the data frame is determined to be a low-priority data frame, a minimum number of subcarriers, from the low-priority subcarriers, required for communication of the data frame is determined and the data frame is communicated using the minimum number of subcarriers. If the data frame is determined to be a high-priority data frame, a maximum number of subcarriers available, including the high-priority subcar-
(Continued)

riers and the low-priority subcarriers, is determined and the data frame is communicated using the maximum number of subcarriers.

20 Claims, 3 Drawing Sheets

(51) Int. Cl.
    *H04B 3/54*     (2006.01)
    *H04L 27/00*     (2006.01)
    *H04J 11/00*     (2006.01)
    *H04L 27/26*     (2006.01)
    *H04W 72/04*     (2009.01)

(52) U.S. Cl.
    CPC .......... *H04L 5/0007* (2013.01); *H04L 5/0032* (2013.01); *H04L 5/0033* (2013.01); *H04L 5/0037* (2013.01); *H04L 5/0044* (2013.01); *H04L 5/0094* (2013.01); *H04L 27/0006* (2013.01); *H04L 27/2601* (2013.01); *H04B 2203/5416* (2013.01); *H04W 72/0453* (2013.01)

(58) Field of Classification Search
    USPC ................................................ 375/260, 259
    See application file for complete search history.

(56) References Cited

U.S. PATENT DOCUMENTS

| | | |
|---|---|---|
| 6,192,248 B1 | 2/2001 | Solondz |
| 6,424,624 B1 | 7/2002 | Galand et al. |
| 6,934,340 B1 | 8/2005 | Dollard |
| 7,327,697 B1 | 2/2008 | Friday et al. |
| 7,352,688 B1 | 4/2008 | Perahia et al. |
| 7,352,718 B1 | 4/2008 | Perahia et al. |
| 7,359,311 B1 | 4/2008 | Paranjpe et al. |
| 7,466,981 B1 | 12/2008 | Abdelhamid et al. |
| 7,593,356 B1 | 9/2009 | Friday et al. |
| 7,616,604 B2 | 11/2009 | Abdelhamid et al. |
| 7,724,650 B2 | 5/2010 | Karam |
| 7,787,897 B2 | 8/2010 | Banh et al. |
| 7,884,763 B2 | 2/2011 | Na et al. |
| 7,925,268 B2 | 4/2011 | Sanders et al. |
| 7,995,525 B1 | 8/2011 | Perahia et al. |
| 8,031,786 B2 | 10/2011 | Wang et al. |
| 8,040,831 B2 | 10/2011 | Kurtz et al. |
| 8,068,552 B2 | 11/2011 | Wang et al. |
| 8,073,489 B2 | 12/2011 | Liu et al. |
| 8,082,347 B2 | 12/2011 | Abdelhamid et al. |
| 8,130,875 B2 | 3/2012 | Liu et al. |
| 8,134,503 B2 | 3/2012 | Na et al. |
| 8,145,272 B2 | 3/2012 | Wang et al. |
| 8,218,677 B2 | 7/2012 | Jin et al. |
| 8,218,969 B2 | 7/2012 | Forghieri et al. |
| 8,249,509 B2 | 8/2012 | Wang et al. |
| 8,374,105 B1 | 2/2013 | Perahia et al. |
| 8,379,524 B1 | 2/2013 | Jacobs et al. |
| 8,411,807 B1 | 4/2013 | Rangarajan et al. |
| 8,416,802 B2 | 4/2013 | Jin et al. |
| 2006/0050668 A1 | 3/2006 | Harper et al. |
| 2006/0294246 A1 | 12/2006 | Stieglitz et al. |
| 2007/0026868 A1 | 2/2007 | Schulz et al. |
| 2009/0190535 A1 | 7/2009 | Hassan et al. |
| 2009/0310692 A1 | 12/2009 | Kafle et al. |
| 2010/0142540 A1 | 6/2010 | Matheney et al. |
| 2010/0162329 A1 | 6/2010 | Ford et al. |
| 2011/0026630 A1 | 2/2011 | Stager et al. |
| 2011/0236013 A1 | 9/2011 | Gazzola et al. |

FOREIGN PATENT DOCUMENTS

| | | |
|---|---|---|
| WO | 0239631 | 5/2002 |
| WO | 2008144323 A1 | 11/2008 |

OTHER PUBLICATIONS

Winter et al., "RPL: IPv6 Routing Protocol for Low-Power and Lossy Networks", Internet Engineering Task Force, Request for Comments 6550, Mar. 2012, 158 pages.

Xu et al., "Hierarchical Opportunistic Scheduling in Multi-Service OFDMA Networks", International Conference on Wireless Communications, Networking and Mobile Computing, Sep. 2007, pp. 2004-2007, Institute of Electrical and Electronics Engineers, Piscatawa, New Jersey.

Pettersson et al., "Notification of Transmittal of the International Search Report and the Written Opinion of the International Searching Authority, or the Declaration", Patent Cooperation Treaty, PCT/US2013/033522, Mailed Aug. 20, 2013, 9 pages, EPO, Rijswijk, Netherlands.

OPTIMIZING THROUGHPUT OF DATA FRAMES IN ORTHOGONAL FREQUENCY DIVISION MULTIPLEXING (OFDM) COMMUNICATION NETWORKS

RELATED APPLICATION

The present application in a Continuation Application of U.S. patent application Ser. No. 13/538,442, filed Jun. 29, 2012, which claims priority to U.S. Provisional Pat. Application Ser. No. 61/614,975, filed Mar. 23, 2012, entitled TECHNIQUES FOR USE IN ORTHOGONAL FREQUENCY DIVISION MULTIPLEXING (OFDM) COMMUNICATION NETWORKS, by Hui et al., the contents of which are hereby incorporated by reference.

TECHNICAL FIELD

The present disclosure relates generally to communication networks, and, more particularly, to communication networks employing orthogonal frequency division multiplexing (OFDM).

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. For instance, LLNs communicate over a physical medium that is strongly affected by environmental conditions that change over time, and often use low-cost and low-power transceiver designs with limited capabilities (e.g., low throughput and limited link margin).

To help provide greater throughput and robustness, Orthogonal Frequency Division Multiplexing (OFDM) utilizes additional bandwidth by allowing transmission of multiple data streams across orthogonal subcarriers simultaneously to increase throughput. Adjusting the number of subcarriers and code-rate can vastly change the effective throughput of the link. In addition, Adaptive Tone Mapping is a process that dynamically selects which subcarriers and coding parameters to use when transmitting a data frame. The goal of Adaptive Tone Mapping is to maximize throughput and minimize channel utilization by only transmitting on usable subcarriers and optimizing the code-rate without sacrificing robustness. Current techniques for selection, allocation, and utilization of subcarriers, however, offer room for improvement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more aspects of the disclosure, optimizing throughput of data frames may comprise maintaining a predetermined number of first-priority subcarriers for use in communicating first-priority data frames and a predetermined number of second-priority subcarriers for use in communicating second-priority data frames. A data frame is received and a data frame priority is determined for the data frame. If the data frame is determined to be a second-priority data frame, a minimum number of subcarriers, from the second-priority subcarriers, required for communication of the data frame is determined and the data frame is communicated using the minimum number of subcarriers. If the data frame is determined to be a first-priority data frame, a maximum number of subcarriers available, including the first-priority subcarriers and the second-priority subcarriers, is determined and the data frame is communicated using the maximum number of subcarriers.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

Figure 1:
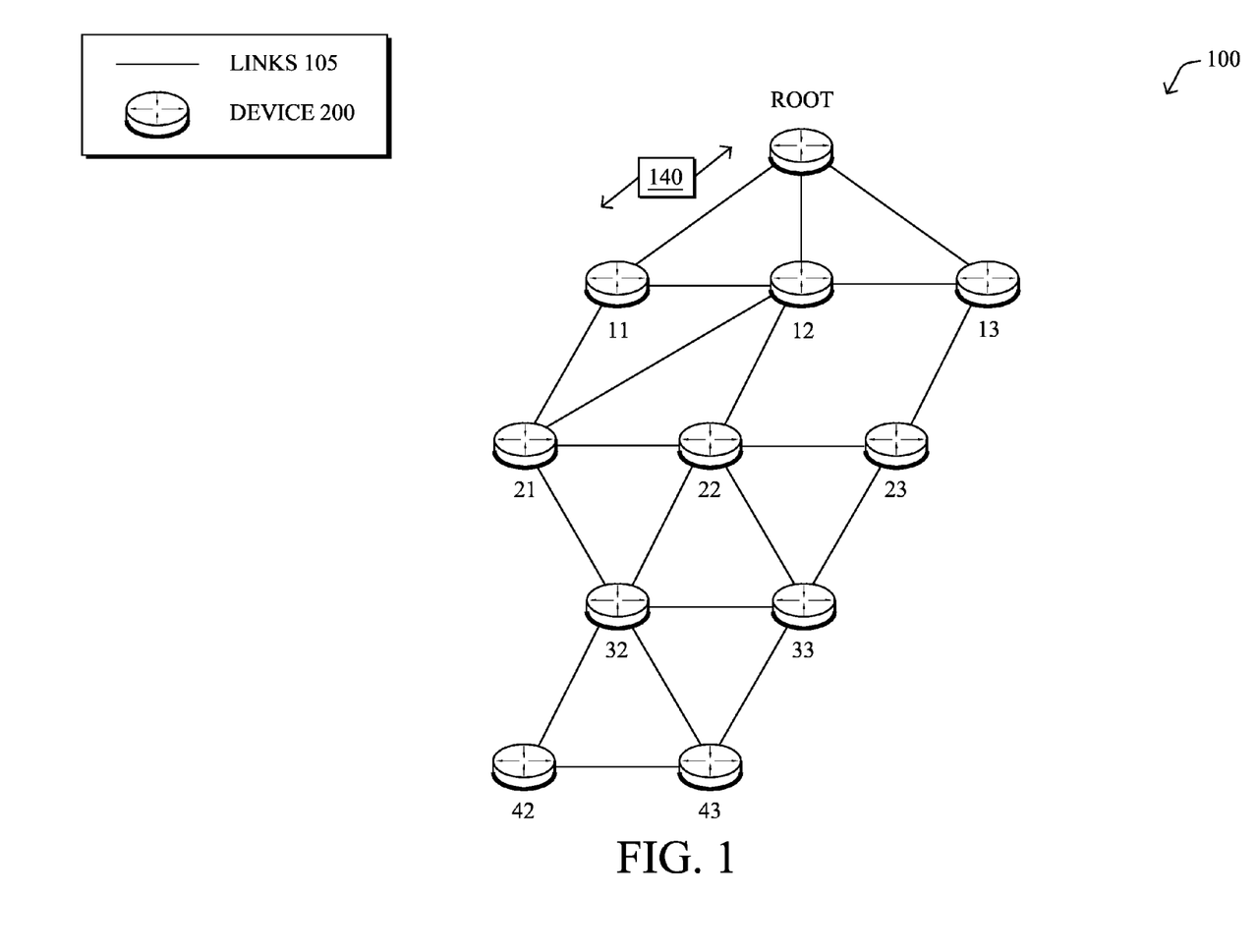
FIG. 1 illustrates an example communication network.

FIG. 1 is a schematic block diagram of an example computer network 100 illustratively comprising nodes/devices 200 (e.g., labeled as shown, "root," "11," "12," . . . "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is only one example of a computer network 100. Also, those skilled in the art will further understand that while the network is shown in a certain orientation, particularly with a "root" node, the network 100 is merely an example illustration that is not meant to limit the disclosure.

Data packets/data frames 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
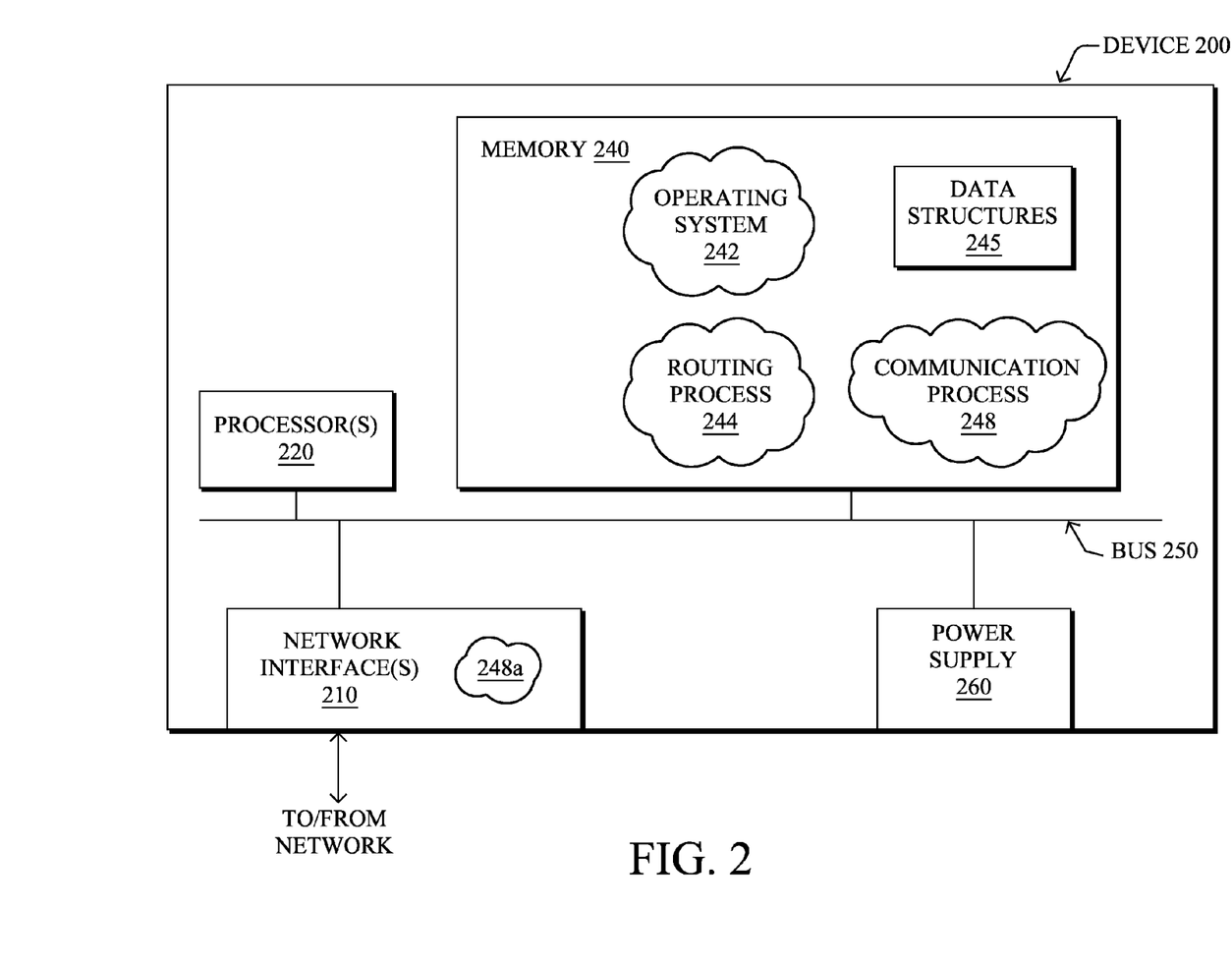
FIG. 2 illustrates an example network device/node.

FIG. 2 is a schematic block diagram of an example node/device 200 that may be used with one or more embodiments described herein, e.g., as any of the nodes shown in FIG. 1 above. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. Links 105 may include a plurality of subcarriers and data frames/packets may be communicated over the subcarriers between devices 200. The network interfaces 210 may be configured to transmit and/or receive data using a variety of different communication protocols. Note, further, that the nodes 200 may have two different types of network interfaces 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply 260. In some specific configurations, the PLC signal may be coupled to the power line feeding into the power supply 260.

The memory 240 comprises a plurality of storage locations that are addressable by the processor 220 and the network interfaces 210 for storing software programs and data structures 245 associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor 220, functionally organizes the device 200 by, inter alia, invoking operations in support of software processes and/or services executing on the device 200. These software processes and/or services may comprise an illustrative routing process 244 (for routing devices), and a communication process 248, as described herein. Note that while the communication process 248 is shown in centralized memory 240, alternative embodiments provide for the process 248 to be specifically operated within the network interfaces 210, such as a component of the MAC or PHY layer of the interface 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 (on routing-capable devices) contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example proactive routing protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

As noted, though, LLNs face a number of communication challenges:

1) LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g. transmissions from other transceivers) to months (e.g. seasonal changes of outdoor environment).
2) Low-cost and low-power designs limit the capabilities of the transceiver. In particular, LLN transceivers typically provide low throughput. Furthermore, LLN transceivers typically support limited link margin, making the effects of interference and environmental changes visible to link and network protocols.
3) Shared-media communication networks, such as power-line communication (PLC) networks (a type of communication over power-lines), provide an enabling technology for networking communication and can be used for example in AMI networks, and are also useful within home and buildings. Interestingly, PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

To help provide greater throughput and robustness, Orthogonal Frequency Division Multiplexing (OFDM) is being standardized by IEEE 802.15.4g, HomePlug, and IEEE P1901.2. OFDM utilizes additional bandwidth by allowing transmission of multiple data streams across orthogonal subcarriers simultaneously to increase throughput. With optimal erasure codes (e.g., Reed-Solomon), a data frame can be coded across multiple subcarriers to tolerate erasures across different subcarriers and even the complete loss of an individual subcarrier during a packet transmission. In addition, repetition codes may also be applied to provide extremely robust communication, albeit at a very low throughput (known as "ROBO" mode in HomePlug and IEEE P1901.2). Adjusting the number of subcarriers and code-rate can vastly change the effective throughput of the link. For IEEE P1901.2, the effective throughput can range from 2.4 kbps to 34.2 kbps, notably more than an order of magnitude difference.

In addition, Adaptive Tone Mapping is a process that dynamically selects which subcarriers and coding parameters to use when transmitting a data frame. The goal of Adaptive Tone Mapping is to maximize throughput and minimize channel utilization by only transmitting on usable subcarriers and optimizing the code-rate without sacrificing robustness. HomePlug and IEEE P1901.2 currently provide mechanisms to send a Tone Map Request (TMREQ) to a neighboring device. HomePlug and IEEE P1901.2 currently require that all TMRs be sent using all available subcarriers to allow the receiver to evaluate the quality on each subcarrier. The quality may be represented as one or more of signal-to-noise-ratio (SNR), bit-error rate, frame-error rate, etc. Upon receiving a TMREQ, a device evaluates the quality of each subcarrier and includes them in a Tone Map Reply (TMREP). Devices maintain a neighbor table indicating the quality of each subcarrier, allowing them to perform tone mapping for subsequent transmissions to optimize throughput.

Current techniques for selection, allocation, and utilization of subcarriers, however, offer room for improvement. Therefore, various techniques are hereinafter shown and described for use with OFDM-based communication networks.

Illustratively, the techniques described herein may be performed by hardware, software, and/or firmware, such as in accordance with the communication process 248, which may contain computer executable instructions executed by the processor 220 (or independent processor of interfaces 210) to perform functions relating to the novel techniques described herein. For example, the techniques herein may be treated as extensions to conventional communication protocols, such as the various protocols that utilize OFDM communication (e.g., wireless protocols, PLC protocols, or other shared media protocols), and as such, may be processed by similar components understood in the art that execute those protocols, accordingly.

Priority-Based Subcarrier Assignment Strategy

Existing OFDM systems (e.g., HomePlug and P1901.2) select the Tone Map that optimizes the robustness and throughput of transmissions. In other words, a transmitter selects the set of subcarriers to utilize irrespective of the priority of a data frame. This behavior is a direct result of treating all subcarriers as a single, shared communication channel. While OFDM is fundamentally built upon utilizing multiple orthogonal subcarriers, the data frame priority does not factor into how those subcarriers are utilized. In particular, a high-priority data frame transmission may have to wait for a low-priority data frame transmission to complete.

In particular, current OFDM systems, such as HomePlug and IEEE P1901.2, provide a priority-based Medium Access Control (MAC) primitive that attempts to provide higher throughput and lower latency to high-priority data frames. This MAC primitive is based on the backoff window size. High-priority data frames have a small backoff window, while low-priority data frames have a large backoff window. With a smaller backoff window, high-priority data frames are more likely to acquire the channel before low-priority data frames.

Unfortunately, the priority mechanisms of HomePlug and P1901.2 only provide preferential treatment during the channel acquisition process. One problem with HomePlug and P1901.2 is that they select the Tone Map (subcarriers) irrespective of the data frame's priority. As a result, even a low-priority data frame can consume a significant number of subcarriers and block a high-priority data frame from beginning transmission until the low-priority data frame completes. This may be especially true because low-priority data frames may oftentimes have a larger or longer size than high-priority data frames.

In Smart Grid AMI applications, for example, low-priority data frames tend to be large in size (e.g., firmware download, management data) while critical, high-priority data frames tend to be small in size (e.g., power outage notifications). With this size discrepancy, high-priority data frames can incur significant delays due to existing low-priority data transmissions by neighboring devices.

Techniques herein, however, determine the active subcarriers based on the priority of a data frame in OFDM-based LLNs. In particular, the techniques herein intelligently assign subcarriers to a data frame transmission based on the data frame's priority, such that as a result, devices are allowed to reserve channel capacity for communicating high-priority data frames even while other low-priority data frames have already begun transmission, which solves a critical issue in low-speed low-power data networks such as PLC.

Figure 3:
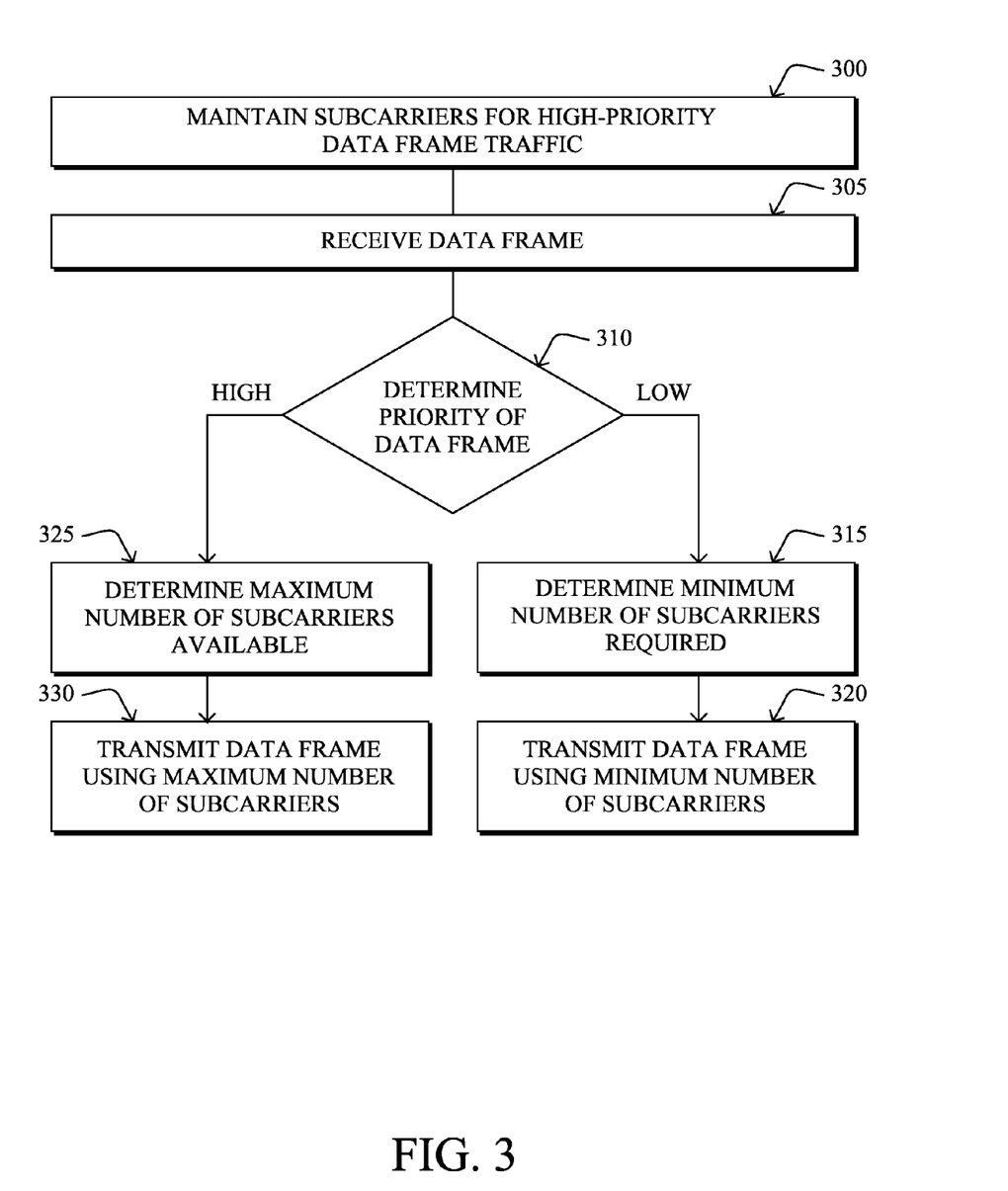
FIG. 3 illustrates an example of a process for optimizing throughput of data frames in a communications network.

With reference to FIG. 3, to prevent multiple devices from sending low-priority data traffic simultaneously from using all subcarriers, devices are configured to ensure that a minimum subcarrier capacity is reserved for high-priority traffic, as shown in Step 300. In one embodiment, devices may reserve a minimum number of subcarriers for use with high-priority traffic. In another embodiment, devices may ensure that a minimum number of subcarriers will become available within some time bound before starting transmission. In yet another embodiment, each device may send a "suggestion" to a dynamically elected "master" in charge of processing all suggested subcarriers (or the number of subcarriers) and select the subcarriers' intersection or the minimum values for all of the subcarriers before broadcasting the information to all of the subcarriers to make sure that the decision is uniformly applied by all devices in the system.

Specifically, according to one or more embodiments of the disclosure as described in detail below, devices are allowed to service high-priority data frames even while neighboring devices are currently transmitting low-priority data frames. To achieve this, the Adaptive Tone Mapping process is modified so that the data frames received by the devices 200 include data frame priority and maximum communication latency, as shown in Step 305, in selecting the number of subcarriers to utilize. As described herein, this priority and communication latency information is used to enforce an upper-bound on subcarrier utilization for low-priority traffic, reserving subcarrier capacity for high-priority traffic. This is in contrast to existing solutions (e.g., HomePlug and P1901.2) that only provide priority mechanisms for channel acquisition that may not be efficient at all since such solutions do not reserve subcarrier capacity for concurrent transmissions.

Operationally, the techniques herein allow the servicing of high-priority packets even if low-priority transmissions are already occurring by neighboring nodes. As noted, this is in contrast to existing systems (e.g., HomePlug and P1901.2), where existing low-priority transmissions must complete before a device can begin a new data frame transmission.

At Step 310, the priority of the received data frame is determined. Techniques herein rely on a mechanism to determine the acceptable communication latency for a data frame. The acceptable latency may be specified by the upper layer when submitting the data frame to the link layer. In one embodiment, the latency may be included in an IPv6 Hop-by-Hop Option. The acceptable latency may also be specified using a priority level that maps into a configurable table that indicates the acceptable latency. Alternatively, the priority level may be specified using the IPv6 Traffic Class. In yet another embodiment, the local system (node) may itself dynamically determine the priority of the packets based on the current waiting time or after packet inspection of relayed and self-generated traffic and pass the information to lower layer via the SAP (Service Access Point-API between layers).

One component of the techniques herein involves modifying the Adaptive Tone Mapping process to include priority and acceptable communication latency in each data frame. With the techniques herein, a device attempts to service high-priority data frames with minimum communication latency. For low-priority data frames, a device tries to reserve the maximum amount of communication resources subject to the acceptable communication latency for the data frame.

At Step 315, if a data frame is determined to be a low-priority data frame, the device determines and attempts to assign the minimum number of subcarriers that will robustly communicate the low-priority data frame within the acceptable communication latency bound. By using the minimum number of subcarriers, the device leaves additional subcarriers available for other devices to utilize for new transmissions. These additional available subcarriers are what allows other devices to service high-priority packets immediately, rather than waiting for existing low-priority data frame transmissions to complete or to preempt transmission of existing low-priority traffic (as performed in some transmission preemptive systems). At step 320, the low-priority data frame is then communicated using the minimum number of subcarriers.

At Step 325, if a data frame is determined to be a high-priority data frame, the device determines and attempts to assign the maximum number of available subcarriers that will robustly communicate the data frame with minimum latency. For example, if no other transmissions are occurring, the device may utilize all subcarriers if every subcarrier provides a useful communication channel. If there are other transmissions occurring, the device determines what subcarriers are available. At step 330, the high-priority data frame is then communicated using the maximum number of subcarriers.

In one embodiment, the device always begins transmission immediately using whatever subcarriers are available. This works well when high-priority data frames are typically small, as is the case for Smart Grid AMI deployments (e.g., power outage notifications).

In another embodiment, the device may decide whether or not to wait for additional subcarriers to become available. If the device has information on when the other subcarriers will become available in the future, the device also computes the communication latency when waiting for those subcarriers to become available and transmitting using a larger number of subcarriers. Note, however, that in waiting for the additional subcarriers, neighboring devices may decide to utilize the currently available subcarriers. In one embodiment, a device waiting for additional subcarriers may begin transmitting a carrier signal in order to acquire those subcarriers. Furthermore, it may decide for some high-priority traffic to immediately transmit while waiting for other high-priority traffic to acquire additional subcarriers according to the packet size and latency requirements.

Note that while this description is described in terms of two priorities, supporting more than two priority levels is possible using the same solution.

Leaving subcarriers available for high-priority data frames or for other devices to use also provides a system that allows devices to receive (RX) and transmit (TX) at the same time. The techniques herein can be used to allow different transmitter-receiver pairs to communicate at the same time in a mesh network. Specifically, if one transmitter-receiver pair was communicating a low-priority frame, another transmitter-receiver pair may initiate a transmission of a high-priority frame, if necessary. One scenario where this capability is important is when using RPL to build multiple routing topologies, each for the different priorities. However, there is additional value in allowing simultaneous RX and TX at the same device. For example, any loop interference issue that occurs when attempting to transmit and receive on the same device may be canceled using digital cancellation with antenna or balun cancellation with minimal added cost to existing transceiver designs, which is enough to allow reception on subcarriers that are not actively currently used for transmission.

Moreover, the techniques herein provide some discussion on how a device chooses subcarriers when transmitting a data frame. Note that in the simplest form, the techniques herein need not involve any form of scheduling. In this simple mode, the network allocates different subcarrier sets to the different priorities and devices utilize the appropriate subset based on the data frame's priority. This simple mode already provides significant advantages to handling high-priority traffic compared to the existing P1901.2 specification.

The more advanced mode discussed above allows devices greater flexibility in using the subcarrier space. One possible usage is to split the subcarrier space into N contiguous subsets. In one allocation, N−1 contiguous subsets may be used for low-priority data frames, while at least 1 subset may be left available for high-priority traffic. When sending a low-priority data frame, the device may choose 1 through N−1 subsets to transmit the data frame, based on the acceptable latency provided within the packet or higher layers. When sending a high-priority data frame, the device may choose whatever subsets are available. Note that this is not meant to imply an advanced form of resource scheduling, since devices are not scheduling the use of subcarriers in time.

The techniques described herein, therefore, provide for a priority-based subcarrier assignment strategy for an OFDM-based communication network. In particular, the examples described may significantly reduce communication latency for high-priority data frames and effectively map the channels' transmission usage to the traffic priority. The techniques herein allow devices to service high-priority data frames even while neighboring devices are currently transmitting low-priority data frames. In Smart Grid AMI deployments, low-priority data frames are typically large (e.g., firmware update) while critical, high-priority data frames are typically small (e.g., power outage notifications). With existing solutions, existing low-priority data frames transmissions can significantly delay the communication of high-priority data frames.

While there have been shown and described illustrative embodiments of techniques for use with OFDM-based communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
   maintaining, using a processor, a predetermined number of high-priority subcarriers for use in communicating high-priority data frames and a predetermined number of low-priority subcarriers for use in communicating low-priority data frames;
   receiving a data frame via a network interface;
   determining, using the processor, a data frame priority for the data frame;
   when the data frame is determined to be a low-priority data frame, determining, using the processor, a minimum number of subcarriers, from the low-priority subcarriers, required for communication of the data frame and communicating the data frame using the minimum number of subcarriers; and when the data frame is determined to be a high-priority data frame, determining, by the processor, a maximum number of subcarriers available for communication of the data frame and communicating the data frame using the maximum number of subcarriers available, and allowing servicing of the high-priority data frame even if low-priority transmissions are already occurring by neighboring nodes, wherein the maximum number of subcarriers available includes available high-priority subcarriers and available low-priority subcarriers.

2. The method of claim 1, wherein the high-priority subcarriers are maintained by reserving a predetermined number of subcarriers for use only in communication of high-priority data frames.

3. The method of claim 1, wherein the high-priority subcarriers are maintained by verifying that the minimum number of subcarriers will be available for high-priority data frame communication within a predetermined time frame.

4. The method of claim 1, wherein the high-priority subcarriers are maintained by:
sending to a master device via the network interface a suggested minimum number of reserved subcarriers;
receiving from the master device via the network interface a minimum number of high-priority subcarriers to reserve; and
reserving the minimum number of high-priority subcarriers for communication of high-priority data frames.

5. The method of claim 1, wherein the data frame priority is determined by the processor based on an acceptable communication latency that is included in the data frame.

6. The method of claim 1, wherein the data frame priority is included in the data frame.

7. The method of claim 1, wherein the maximum number of subcarriers available comprises all available high-priority subcarriers and all available low-priority subcarriers.

8. The method of claim 1, wherein determining the maximum number of subcarriers comprises:
determining the currently available subcarriers;
determining additional subcarriers that will become available within a predetermined time frame; and
transmitting the high-priority data frame using the currently available subcarriers and the additional subcarriers after the predetermined time frame.

9. An apparatus, comprising:
a network interface adapted to communicate data frames over a network using a plurality of subcarriers;
a processor configured to communicate with the network interface;
a memory configured to communicate with the processor, the memory having instructions stored thereon that, in response to execution by the processor, cause the processor to perform operations comprising;
maintaining a predetermined number of high-priority subcarriers for use in communicating high-priority data frames and a predetermined number of low-priority subcarriers for use in communicating low-priority data frames from the plurality of subcarriers;
receiving a data frame via the network interface;
determining a data frame priority for the data frame;
in response to the data frame being a low-priority data frame, determining a minimum number of subcarriers, from the low-priority subcarriers, required for communication of the data frame and communicating the data frame using the minimum number of subcarriers; and in response to the data frame being a high-priority data frame, determining, by the processor, a maximum number of subcarriers available for communication of the data frame and communicating the data frame using the maximum number of subcarriers available, and allowing servicing of the high-priority data frame even if low-priority transmissions are already occurring by neighboring nodes, wherein the maximum number of subcarriers available includes available high-priority subcarriers and available low-priority subcarriers.

10. The apparatus of claim 9, wherein the processor maintains high-priority subcarriers by reserving a predetermined number of subcarriers for use only in communication of high-priority data frames.

11. The apparatus of claim 9, wherein the high-priority subcarriers are maintained by verifying that the minimum number of subcarriers will be available for high-priority data frame communication within a predetermined time frame.

12. The apparatus of claim 9, wherein the high-priority subcarriers are maintained by:
sending to a master device via the network interface a suggested minimum number of reserved subcarriers;
receiving from the master device via the network interface a minimum number of high-priority subcarriers to reserve; and
reserving the minimum number of high-priority subcarriers for communication of high-priority data frames.

13. The apparatus of claim 9, wherein the data frame priority is determined based on an acceptable communication latency that is included in the data frame.

14. The apparatus of claim 9, wherein the data frame priority is included in the data frame.

15. The apparatus of claim 1, wherein the maximum number of subcarriers available comprises all available high-priority subcarriers and all available low-priority subcarriers.

16. The apparatus of claim 9, wherein determining the maximum number of subcarriers comprises:
determining the currently available subcarriers;
determining additional subcarriers that will become available within a predetermined time frame; and
transmitting the high-priority data frame using the currently available subcarriers and the additional subcarriers after the predetermined time frame.

17. A tangible non-transitory computer-readable medium having computer executable instructions stored thereon that, when executed by a computer, cause the computer to perform a method comprising:
maintaining a predetermined number of high-priority subcarriers for use in communicating high-priority data frames and a predetermined number of low-priority subcarriers for use in communicating low-priority data frames from a plurality of subcarriers;
receiving a data frame via a network interface;
determining a data frame priority for the data frame;
in response to the data frame being a low-priority data frame, determining a minimum number of subcarriers, from the low-priority subcarriers, required for communication of the data frame and communicating the data frame using the minimum number of subcarriers; and in response to the data frame being a high-priority data frame,
  determining, by the processor, a maximum number of subcarriers available for communication of the data frame and communicating the data frame using the maximum number of subcarriers available, and
  allowing servicing of the high-priority data frame even if low-priority transmissions are already occurring by neighboring nodes,
  wherein the maximum number of subcarriers available includes available high-priority subcarriers and available low-priority subcarriers.

18. The tangible non-transitory computer-readable medium of claim 17, wherein the maintaining high-priority subcarriers comprises reserving a predetermined number of subcarriers for use only in communication of high-priority data frames.

19. The tangible non-transitory computer-readable medium of claim 17, wherein the high-priority subcarriers are maintained by verifying that the minimum number of subcarriers will be available for high-priority data frame communication within a predetermined time frame.

20. The tangible non-transitory computer-readable medium of claim 17, wherein the high-priority subcarriers are maintained by:
  sending to a master device via the network interface a suggested minimum number of reserved subcarriers;
  receiving from the master device via the network interface a minimum number of high-priority subcarriers to reserve; and
  reserving the minimum number of high-priority subcarriers for communication of high-priority data frames.

* * * * *